US 8,692,769 B1

(12) United States Patent
Bendickson et al.

(10) Patent No.: US 8,692,769 B1
(45) Date of Patent: Apr. 8, 2014

(54) MOUSE MOVEMENT METHOD

(75) Inventors: John Bendickson, Vinton, IA (US); Mitchell Riley, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 209 days.

(21) Appl. No.: 13/223,435

(22) Filed: Sep. 1, 2011

(51) Int. Cl.
*G06F 3/033* (2013.01)

(52) U.S. Cl.
USPC .......................................... 345/157; 345/156

(58) Field of Classification Search
None
See application file for complete search history.

(56) References Cited

U.S. PATENT DOCUMENTS

| | | | | |
|---|---|---|---|---|
| 5,638,826 A | * | 6/1997 | Wolpaw et al. | 600/544 |
| 5,844,824 A | * | 12/1998 | Newman et al. | 345/156 |
| 2006/0125659 A1 | * | 6/2006 | Kim et al. | 341/20 |
| 2008/0030685 A1 | * | 2/2008 | Fergason et al. | 351/210 |

FOREIGN PATENT DOCUMENTS

JP        11-073286     *   3/1999

OTHER PUBLICATIONS

"Dialing With Your Thoughts"; Technology Review, Published by MIT, found at http://www.technologyreview.com/communications/37357/?nlid=4339&a=f; Aug. 31, 2011, 2 pages.

* cited by examiner

*Primary Examiner* — Seokyun Moon
(74) *Attorney, Agent, or Firm* — Donna P. Suchy; Daniel M. Barbieri

(57) ABSTRACT

A device for controlling a pointer includes an electroencephalograph for detecting signals in the midline occipital region of the user's brain, and a display system having a pointer surrounded by flashing regions having differing flashing frequencies. The electroencephalograph detects differing signals caused by the differing flashing frequencies whenever the user is looking at one of the flashing regions having differing flashing frequencies, and the device moves the pointer in the relative direction of that region. All regions remain in the same position relative to the pointer.

16 Claims, 6 Drawing Sheets

US 8,692,769 B1

MOUSE MOVEMENT METHOD

FIELD OF THE INVENTION

The present invention is directed generally toward pointer enabled user interfaces, and particularly toward controlling a pointer in a user interface with eye movement.

BACKGROUND OF THE INVENTION

Modern user interfaces rely heavily on the ability of a user to maneuver a pointer around a display and select various icons or menu options. Pointing devices such as mice, trackballs or trackpads have become ubiquitous. However, some users may lack the physical capacity to use a pointing device; or users may need to interact with a user interface while performing complex manual operations that require both hands. For example, soldiers using advanced combat equipment may have a computer display mounted to their helmets, but a soldier in combat cannot be expected to take one hand off his weapon to select items from his computer display. In those situations, a user cannot use his or her hands to control a pointing device.

Consequently, it would be advantageous if a method and apparatus existed that are suitable for controlling a pointer in a user interface via hand-free, non-audible control.

SUMMARY OF THE INVENTION

Accordingly, the present invention is directed to a novel method and apparatus for controlling a pointer in a user interface via hand-free, non-audible control, such as using different, consciously imperceptible frequencies of flashing light.

One embodiment of the present invention includes a computer with a user interface utilizing a pointer and a sensing device for sensing the user's brain waves. The user interface includes a plurality of regions, each region flashing at a frequency different from every other region. The sensing device interprets variations in the user's brains waves caused by the different frequencies in the different regions of the user interface to determine what portion of the user interface the user is looking at, and then moves the pointer accordingly.

Another embodiment of the present invention is a method for determining a new position for a pointer in a computer user interface based on the user's eye movement. A user looks at a region of a user interface which is divided into a plurality of regions, each region flashing at a different frequency. A sensing device senses differences in brain waves based on the different flashing frequencies and determines based on those differences where the user is looking. The computer then determines a new position for the pointer based on the determination of where the user is looking.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
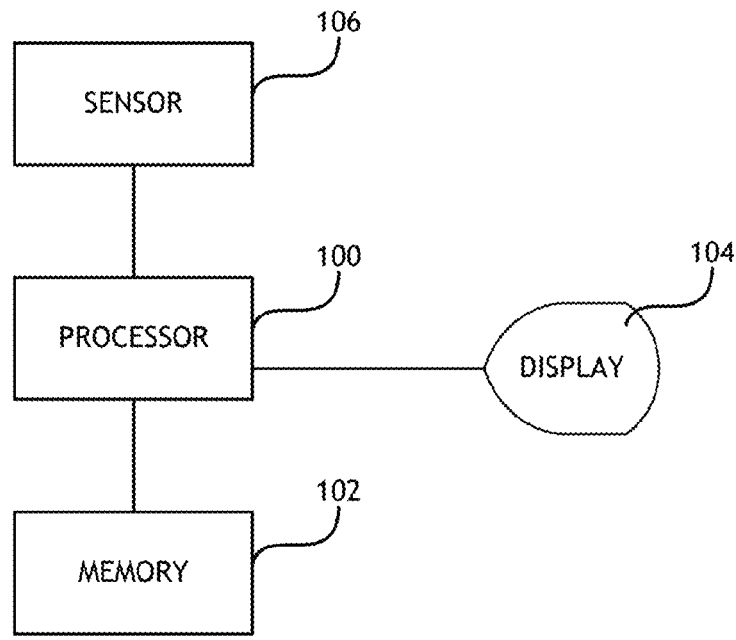
FIG. 1 shows a block diagram of one embodiment of the present invention.

Referring to FIG. 1, a block diagram of an apparatus according to the present invention is shown. The apparatus may include a processor 100 for executing computer code. The processor 100 may be connected to memory 102 for storing the computer code and a display 104 for display a user interface. The processor 100 may also be connected to a sensor 106 for sensing the brain wave patterns of a user.

Figure 2:
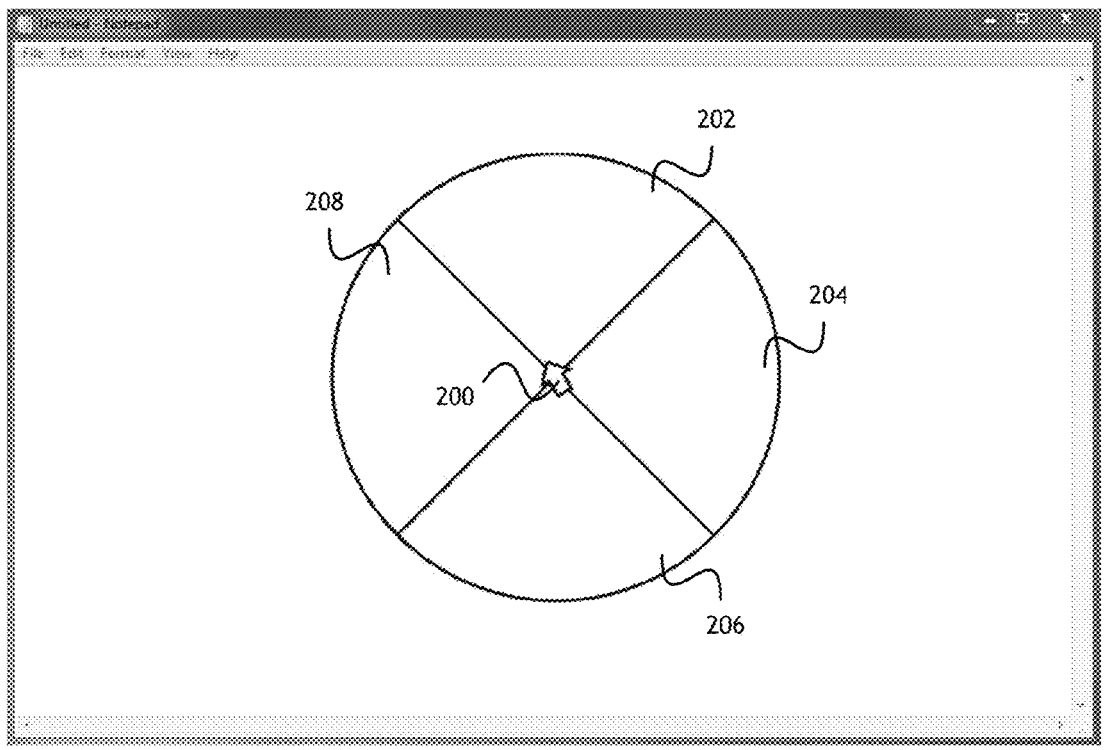
FIG. 2 shows a graphic user interface implementing one embodiment of the present invention.

Referring to FIG. 2, a representative graphic user interface (GUI) implementing the present invention is shown. The GUI may include a pointer 200 and a plurality of flashing regions 202, 204, 206 and 208. FIG. 2 depicts a plurality of flashing regions 202, 204, 206 and 208 forming a circle and delineated by visible lines. In actual application, the flashing regions 202, 204, 206 and 208 may be consciously imperceptible to the user, with no obvious delineation between flashing regions 202, 204, 206 and 208 or areas of the GUI outside the flashing regions 202, 204, 206 and 208.

Each flashing region 202, 204, 206 and 208 may flash at a certain frequency distinct from the frequency of each other flashing region 202, 204, 206 and 208. Two flashing frequencies are distinct when the brain wave patterns of a person looking at one flashing frequency are distinguishable from the brain waves patterns of the same person looking at the other flashing frequency as brain waves are measured by electro encephalography (EEG).

Research has shown that different frequencies of flashing light result in distinct brain wave patterns in the midline occipital region of the brain, readable by EEG. When an individual looks at a certain frequency of flashing light, the individual's brain waves will appear different from the same individual's brain waves when looking at a different frequency of flashing light. That observation is true even when the flashing is consciously imperceptible to the individual.

The flashing regions 202, 204, 206 and 208 may be organized as quadrants with a common point centered at the pointer 200. By looking at a particular flashing region 202, 204, 206 and 208, a user may direct the relative movement of the pointer. For example, a first region 202, positioned above the pointer 200 may flash at a frequency of nine hertz while a second region 204 may flash at a frequency of nine and one quarter hertz. In this example, a frequency differentiation of 0.25 hertz is specified; in practice, any minimum frequency differentiation capable of producing distinguishable brain wave patterns may be used. When a user looks at the first region 202, the user produces certain brain wave patterns different from the user's brain wave patterns when the user looks at the second region 204. The user's brain wave patterns can be measured and distinguished with EEG. When the user's brain waves, as measured by EEG, indicate that the user is looking at the first region 202, the computer utilizing the GUI may move the pointer 200 up, toward the first region 202. The computer may also reposition every other region 204, 206 and 208 to maintain a quadrant layout of the flashing regions 202, 204, 206 and 208 centered at the pointer 200. If the user's brain wave patterns, as measured by EEG, subsequently indicate that the user is looking at the second region 204, the computer utilizing the GUI may move the pointer 200 right, toward the second region 204. The computer may also reposition every other region 202, 206 and 208 to maintain a quadrant layout of the flashing regions 202, 204, 206 and 208 centered at the pointer 200.

While FIG. 2 depicts a GUI having four flashing regions 202, 204, 206 and 208 divided into quadrants, one skilled in the art will appreciate that different numbers of regions in different configurations may be desirable provided the regions are dynamically repositionable, and remain in the same position relative to a pointer 200. One skilled in the art will also appreciate that every portion of the GUI may be incorporated into one of the flashing regions 202, 204, 206 and 208 such that flashing regions 202, 204, 206 and 208 cover the entire GUI.

Flashing regions 202, 204, 206 and 208 in a GUI such as depicted in FIG. 2 may maintain their relative positions with relation to each other, but rotate about the pointer 200. By rotating the flashing regions 202, 204, 206 and 208 between measurement periods, a processor 100 may correlate different brain wave measurements from different brain wave measurement periods to determine were in a particular quadrant a user is looking. Measurements periods may be some frequency below the Nyquist limit of the shortest frequency flashing region 202, 204, 206 or 208.

Figure 3:
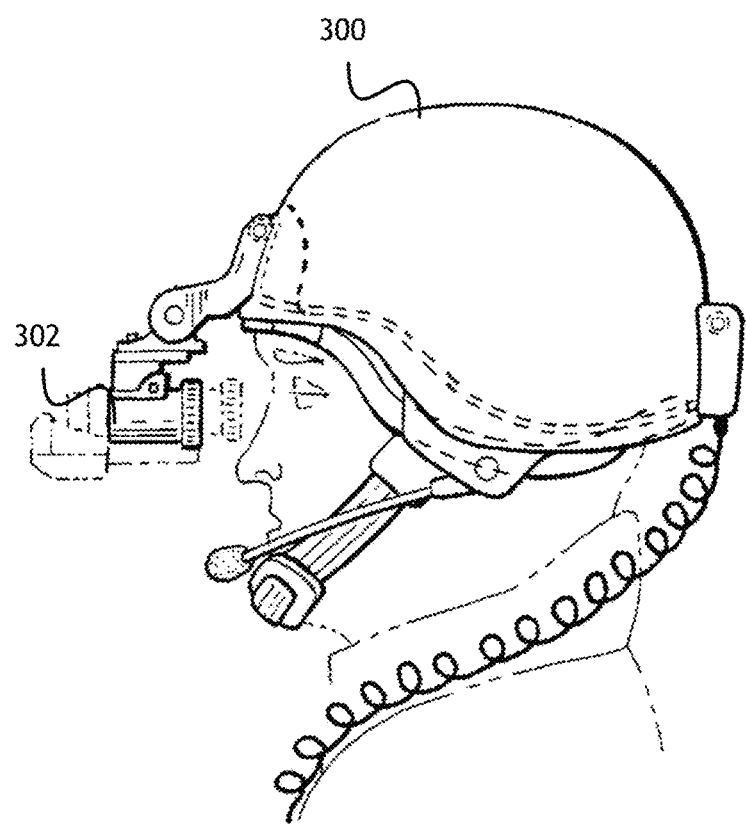
FIG. 3 shows a helmet mounted display useful for implementing embodiments of the present invention.
Figure 4:
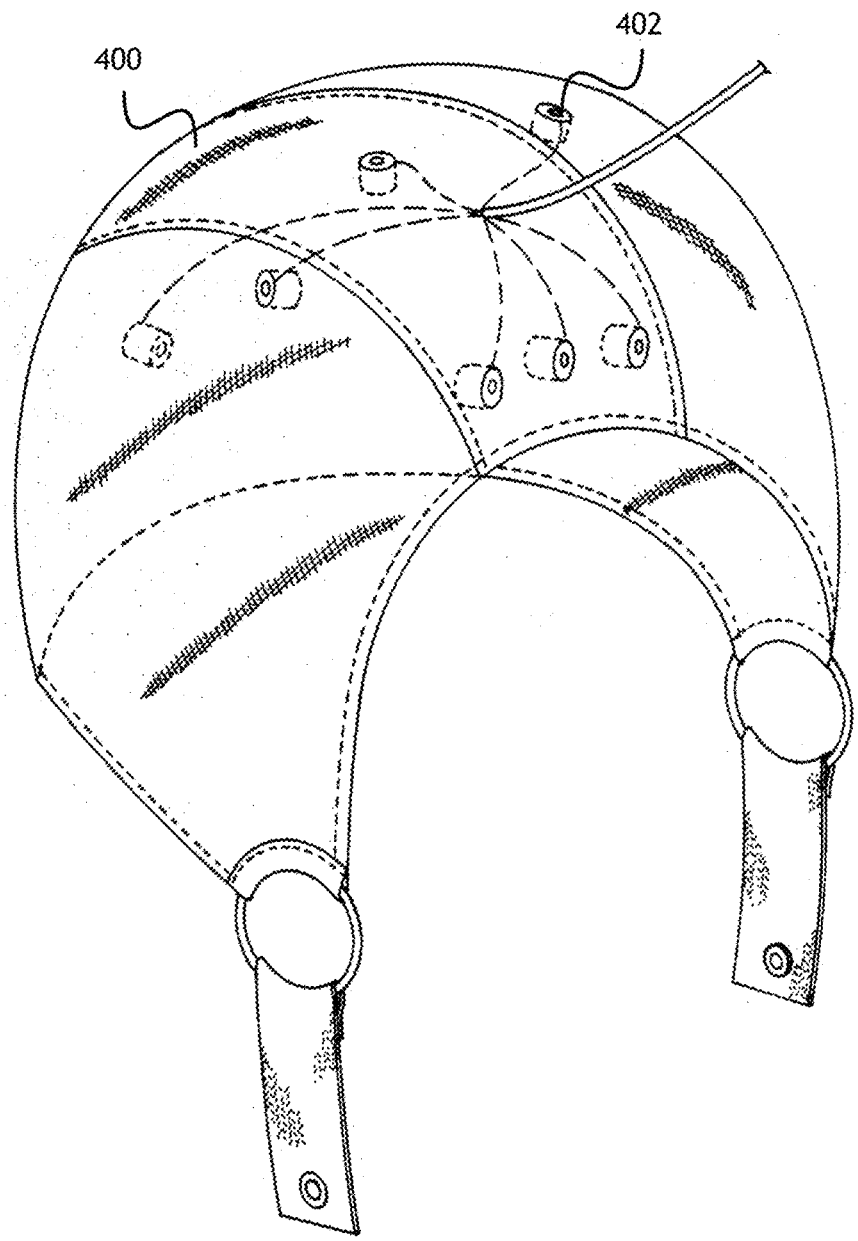
FIG. 4 shows a brain wave sensing apparatus useful for implementing embodiments of the present invention.

Referring to FIG. 3, soldiers using advanced combat equipment may have a helmet 300 with a mounted display 302. Where such a mounted display 302 incorporates a GUI according to the present invention, the soldier may direct the movement of a pointer 200 without the need of either hand. The soldier's helmet 300 may also incorporate an EEG sensor 106 such as depicted in FIG. 4. An EEG sensor 106 generally comprises a plurality of electrodes 402 capable of detecting electrical activity in a persons brain when placed at certain specific points on the person's head. Each electrode 402 may be individually positioned or incorporated into a cap 400 at specific locations such that each electrode 402 may be in relatively the same location whenever a person puts on the cap 400. Each electrode 402 may be connected to a processor 100 that may interpret data received from each electrode 402 to determine what flashing region 202, 204, 206 or 208 the user is currently looking at.

Figure 5:
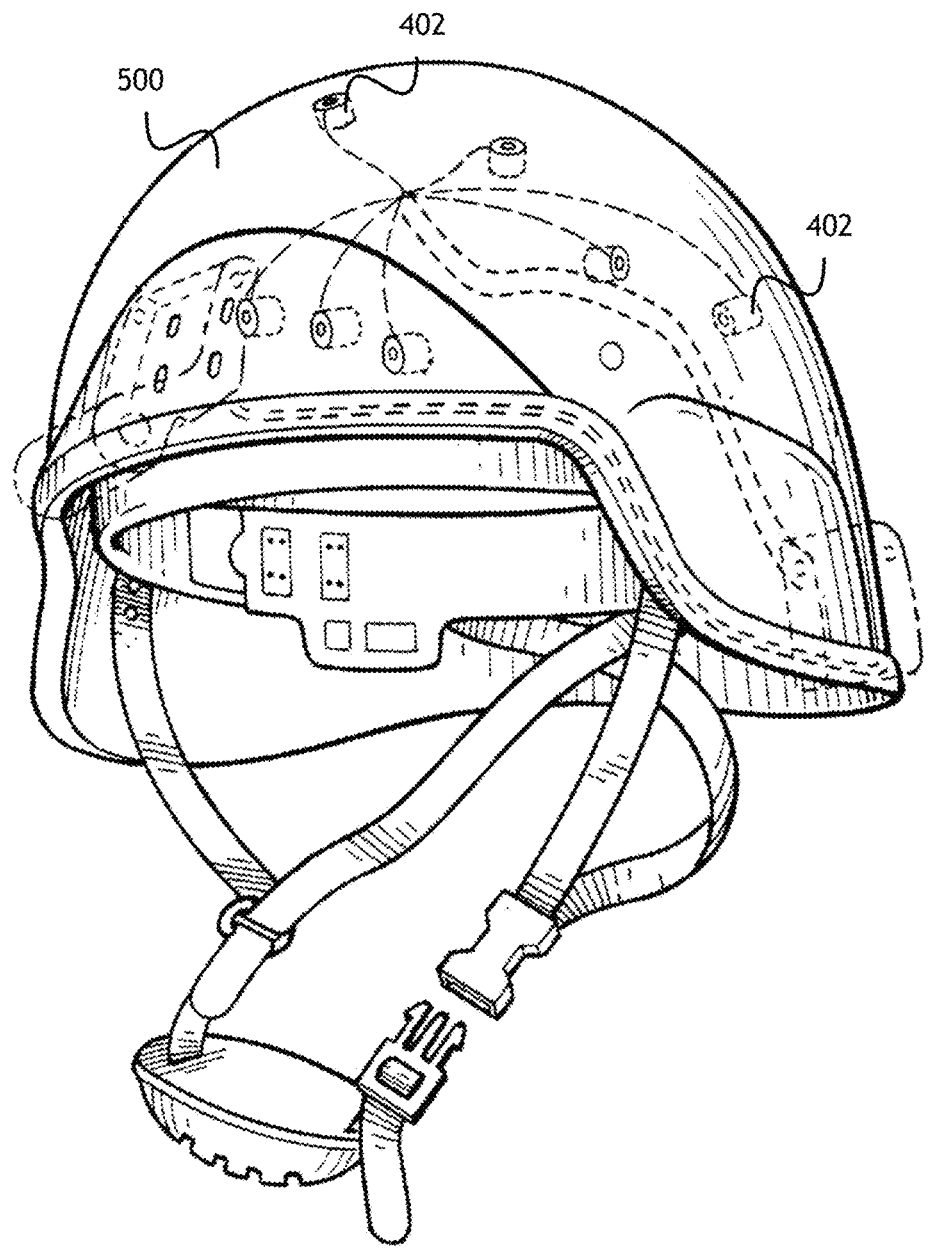
FIG. 5 shows a helmet incorporating brain wave sensors useful for implementing embodiments of the present invention.

Referring to FIG. 5, electrodes 402 may be incorporated into a helmet 500. The helmet depicted in FIG. 3 may further incorporate electrodes 402 at fixed locations within the helmet 500, such that the electrodes 402 may contact the user's head. In such an implementation, the plurality of electrodes 402 may form an EEG sensor 106 connected to a processor 100. A mounted display 302 may also be connected to the processor 100. The processor 100 may display a GUI on the mounted display 302 with a plurality of flashing regions 202, 204, 206 and 208 centered on a pointer 200, each flashing region 202, 204, 206 and 208 flashing at a different frequency. As a user looks at the plurality of flashing regions 202, 204, 206 and 208, each flashing frequency causes the user to produce distinct brain wave patterns. The user's brain wave patterns are detected by the electrodes 402 of the EEG sensor 106 and interpreted by the processor 100. The processor then moves the pointer 200 and the plurality of flashing regions 202, 204, 206 and 208.

Figure 6:
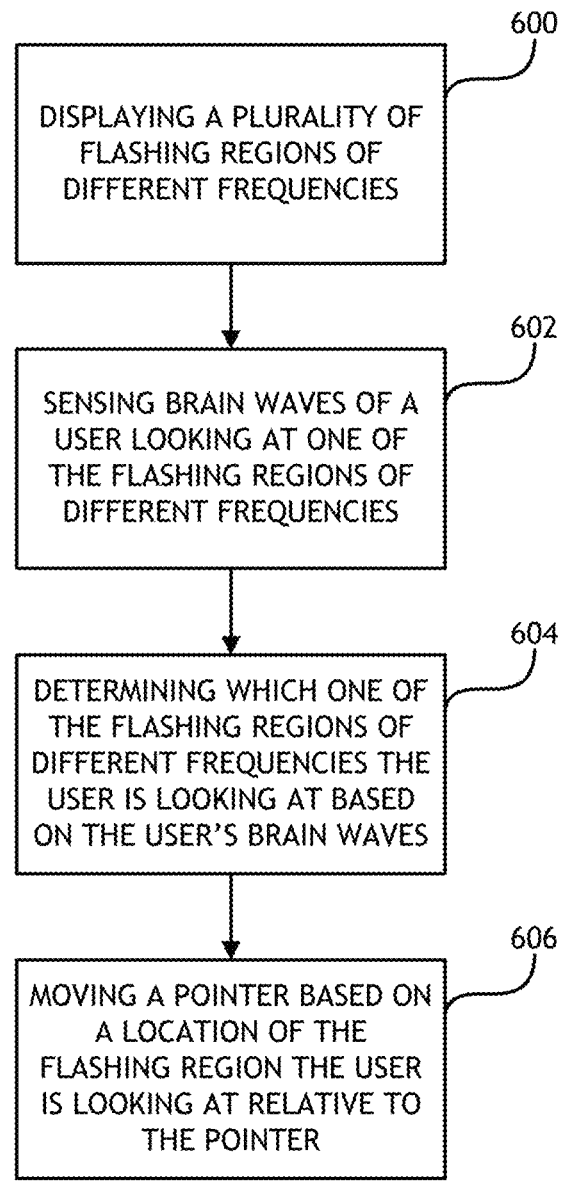
FIG. 6 shows a flowchart of another embodiment of the present invention for moving a pointer.

Referring to FIG. 6, a flowchart showing a method for moving a pointer 200 is shown. A computer implementing a GUI may display 600 a plurality of flashing regions 202, 204, 206 and 208 of different frequencies. Each flashing region 202, 204, 206 and 208 may be positioned relative to a pointer 200, but dynamically repositionable relative to the rest of the GUI. An EEG sensor 106 connected to the processor may sense 602 brain wave patterns of a user. The different frequencies of each flashing region 202, 204, 206 and 208 induce distinct brain wave patterns in the user detectable by the EEG sensor 106. The processor may then determine 604 which flashing region 202, 204, 206 or 208 the user was looking at based on the distinct brain wave pattern detected by the EEG sensor 106. While brain wave patterns for a particular user are distinct for different flashing frequencies, brain wave patterns may be unique to a particular user and may require an initiation process to provide a processor 100 a data set sufficient to differentiate the user's brain wave patterns. Such a data set may be stored in memory 102 connected the processor 100. Once the processor has determined 604 which flashing region 202, 204, 206 or 208 the user was looking at, the processor may move 606 the pointer 200 some distance in the direction indicated by such flashing region 202, 204, 206 and 208 and reposition the flashing regions 202, 204, 206 and 208 accordingly. The method may continuously repeat to update the position of the pointer 200.

Figure 7:
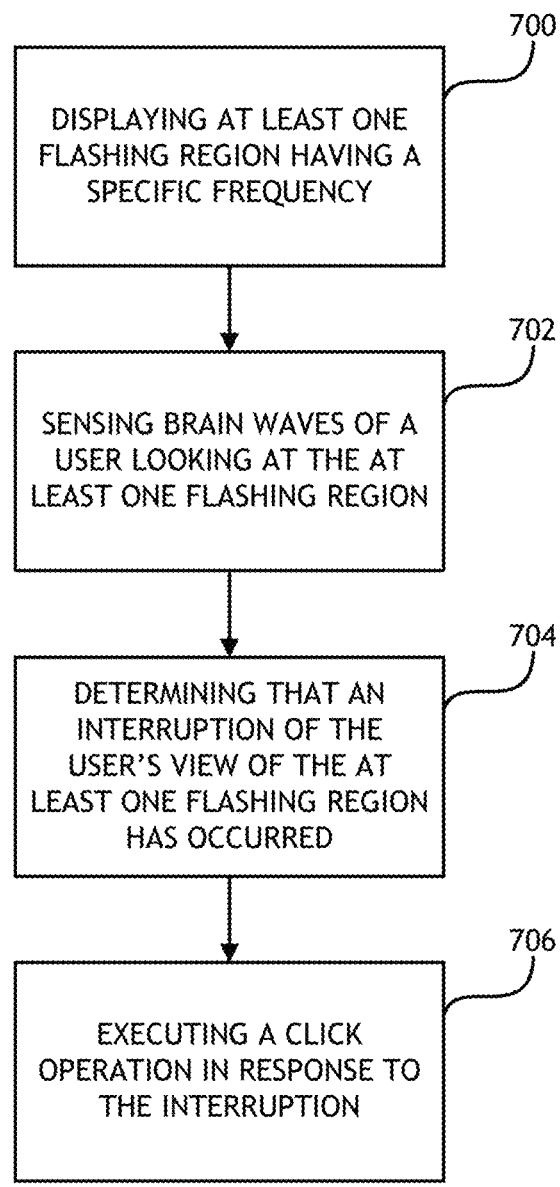
FIG. 7 shows a flowchart of another embodiment of the present invention for clicking a pointer.

Referring to FIG. 7, a flowchart showing a method for selecting in a GUI is shown. A computer implementing a GUI may display 700 at least one flashing region 202, 204, 206 and 208 having a specific frequency. An EEG sensor 106 connected to the processor may sense 702 brain wave patterns of a user. A user may interrupt his visual perception of a flashing frequency by blinking for some predefined duration. A processor 100 may determine 704 that an interruption of the user's view of the at least one flashing region 202, 204, 206 and 208 has occurred. The processor 100 may then execute 706 a 'click' or selection operation in the GUI wherever the pointer 200 is located. Likewise, the processor 100 may interpret two such operations in rapid succession as a 'double-click.'

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An apparatus for moving a pointer in a graphical user interface comprising:
   a processor;
   memory connected to the processor for storing computer executable code; and
   a helmet comprising:
      a display connected to the processor for displaying a graphic user interface; and an electro encephalography sensor connected to the processor for sensing brain wave patterns, wherein:

the processor is configured to produce a graphical user interface having a pointer and a plurality of flashing regions, each flashing region flashing at a frequency different from every other flashing region, and each flashing region configured to move dynamically within the graphical user interface, but remain in the same position relative to the pointer;

the processor is configured to periodically rotate the flashing regions about the pointer;

the processor is configured to interpret brain wave patterns measured by the electro encephalography sensor to determine which of the plurality of flashing regions a user is currently viewing;

the processor is configured to reposition the pointer and the plurality of flashing regions based on which of the plurality of flashing regions a user is currently viewing; and the flashing regions are configured to denote quadrants of an area centered on the pointer.

2. The apparatus of claim 1, wherein the electro encephalography sensor is configured to sense electrical activity in the midline occipital region of a user's brain.

3. The apparatus of claim 1, wherein the processor is further configured to interpret brain wave patterns measured by the electro encephalography sensor to determine if an interruption of the user's view of a specific flashing region has occurred.

4. The apparatus of claim 3, wherein the processor is further configured to execute an operation when the processor determines that an interruption of the user's view of a specific flashing region has occurred.

5. The apparatus of claim 1, wherein each frequency of each flashing region is consciously imperceptible to a user.

6. A method for using a pointer in a graphical user interface comprising:

displaying a plurality of flashing regions, each flashing region configured to flash at a different frequency;

sensing brain wave patterns of a user looking at one of the flashing regions;

periodically rotating the flashing regions about a center point;

determining which of the flashing regions the user is looking at; and moving a pointer based on a location of the flashing region indicated by the user's brain wave patterns, wherein the plurality of flashing regions denote quadrants of an area centered on the pointer.

7. The method of claim 6, wherein the plurality of flashing regions are dynamically repositionable.

8. The method of claim 7, wherein the plurality of flashing regions remain in a fixed position relative to the pointer.

9. The method of claim 7, further comprising correlating brain wave patterns from a first measurement period and a second measurement period wherein the plurality of flashing regions are in a first configuration relative to the pointer during the first measurement period and the plurality of flashing regions are in a second configuration relative to the pointer during the second measurement period.

10. The method of claim 6, wherein each flashing region has a flashing frequency differentiated from the flashing frequency of every other flashing region by at least 0.25 hertz.

11. The method of claim 6, wherein every portion of the graphical user interface is incorporated into one of the plurality of flashing regions.

12. The method of claim 6, wherein each flashing frequency of each flashing region is consciously imperceptible to a user.

13. A method for using a pointer in a graphical user interface comprising:

displaying two or more flashing regions, each configured to flash at a specific frequency;

sensing brain wave patterns of a user looking at the at least one flashing region;

periodically rotating the flashing regions about a center point to determine a viewing location based on multiple measurement periods;

determining that an interruption of the user's view of the at least one flashing region has occurred; and executing an operation in response to the interruption.

14. The method of claim 13, wherein the interruption comprises a blink of predetermined duration.

15. The method of claim 13, wherein the interruption comprises a distinct first blink and second blink of predetermined duration in rapid succession.

16. The method of claim 13, wherein the specific frequency of the at least one flashing region is imperceptible to a user.

* * * * *